Jan. 4, 1938. E. J. STAHL 2,104,335
VEHICLE
Filed June 20, 1934 2 Sheets-Sheet 1
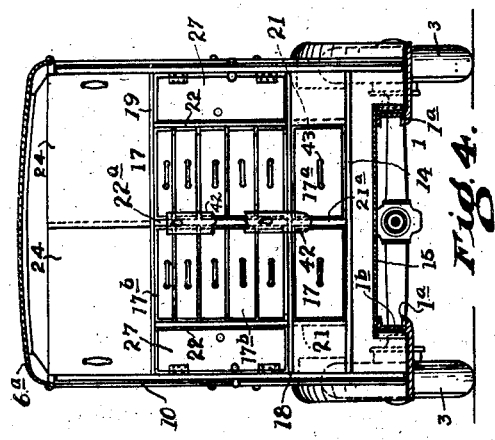
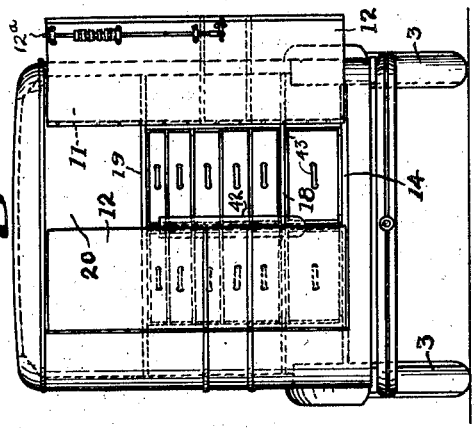
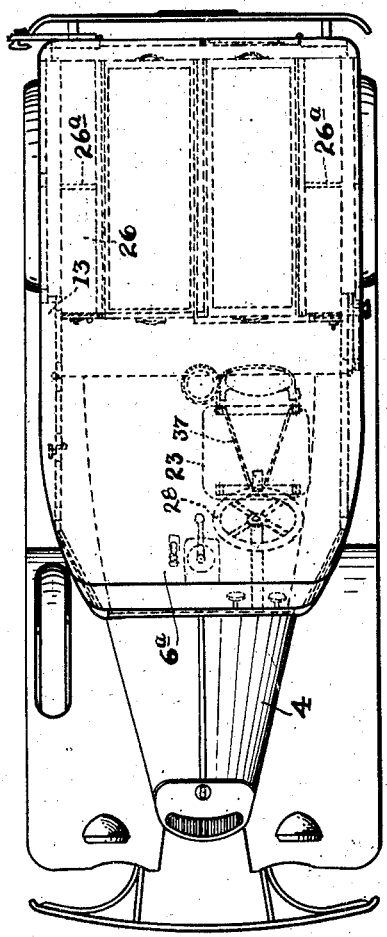
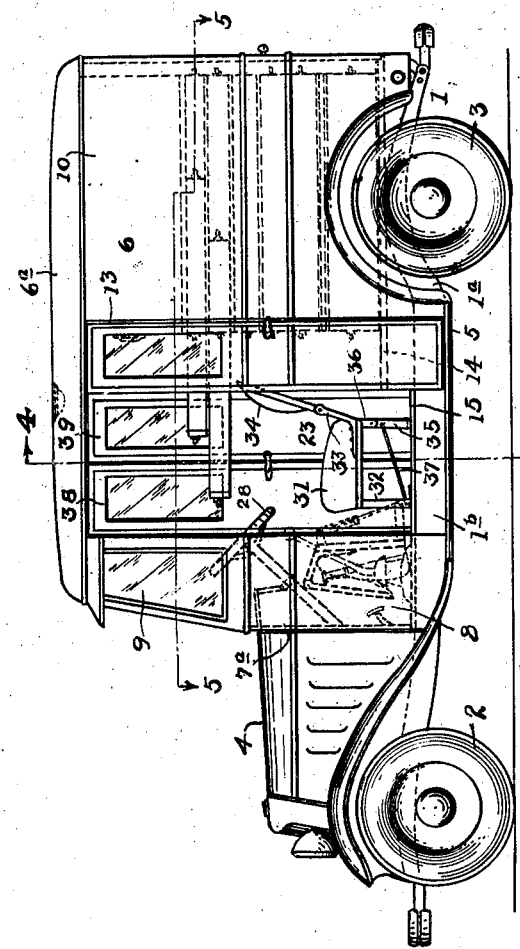
INVENTOR
Edward J. Stahl
By Geo. B. Pitts
ATTORNEY Jan. 4, 1938. E. J. STAHL 2,104,335
VEHICLE
Filed June 20, 1934 2 Sheets-Sheet 2
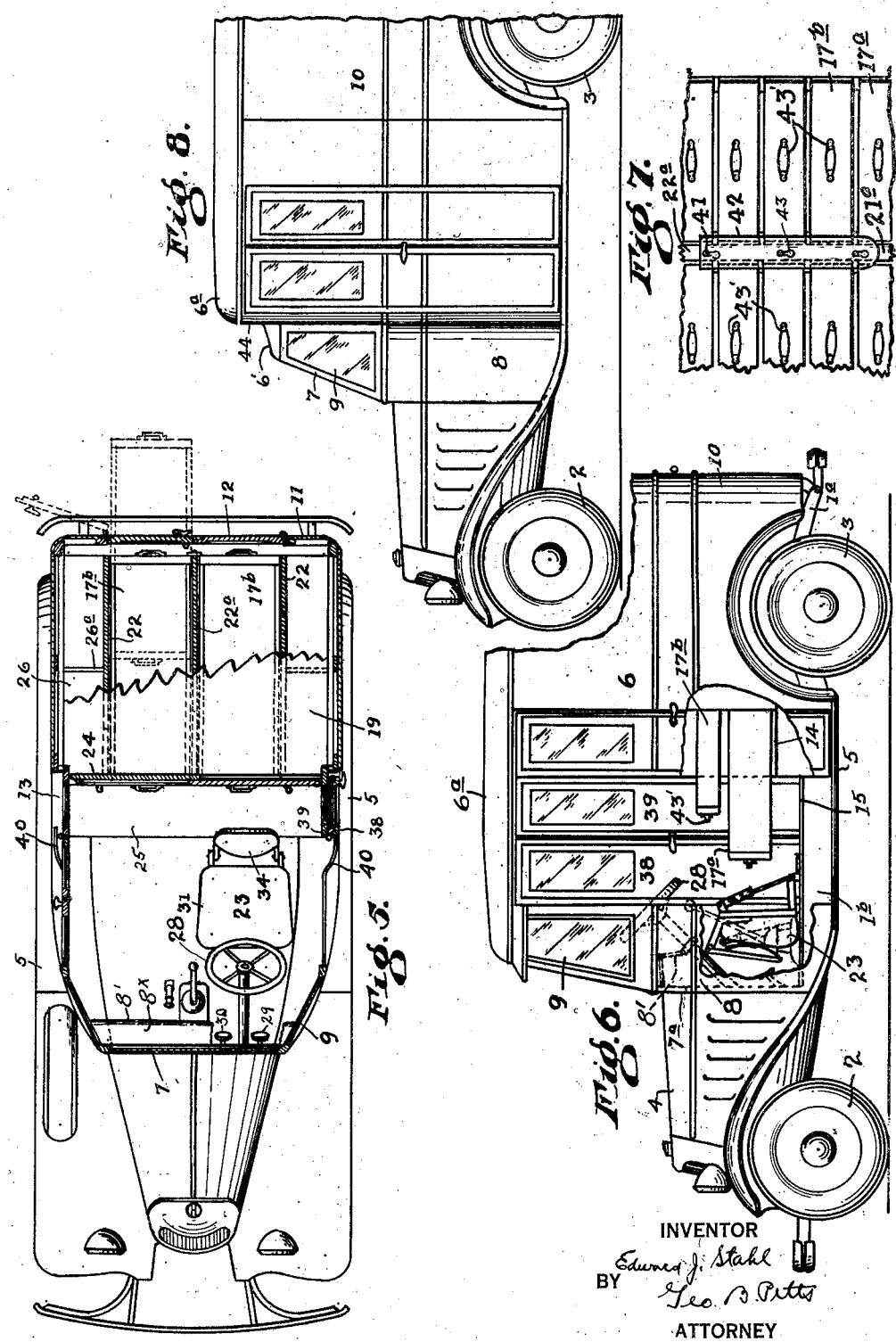
INVENTOR
Edward J. Stahl
BY Geo. B. Pitts
ATTORNEY Patented Jan. 4, 1938

2,104,335

UNITED STATES PATENT OFFICE 2,104,335

VEHICLE

Edward J. Stahl, Lakewood, Ohio, assignor to The Baker-Raulang Company, Cleveland, Ohio, a corporation of Ohio Application June 20, 1934, Serial No. 731,539

1 Claim. (Cl. 296—24)

This invention relates to a motor vehicle, more particularly a vehicle of the delivery type adapted for use in making house-to-house deliveries or sales. The hereinafter disclosed vehicle construction is of a character which lends itself for ready loading with commodities or articles to be vended, for example, bread, rolls, buns and other edible, convenient ingress to the vehicle and egress therefrom and ready inspection and sale of such articles.

Power driven vehicles for house-to-house deliveries have not been found practical, until comparatively recently, largely because of the effort and inconvenience required to enter and leave the vehicle, due to the height of the chassis frame from the ground. To overcome this disadvantage, it has become the practice to provide a chassis with a frame having an intermediate drop section for a flooring in the vehicle body in a plane below the normal floor level, to form therein a transverse aisle. In this form or arrangement, in vehicles of which I have knowledge, the aisle flooring was obstructed by the up-standing housing for the propeller shaft, which prevented free traverse through or in the aisle. This drop section was provided by incorporating it in the chassis frame at extra expense or where the chassis was built and assembled, it was necessary to cut out an intermediate section of the chassis frame and substitute therefor the desired drop section, connecting it to the chassis frame by suitable, welded together bracing elements. Where such alteration was made, danger of affecting the co-ordinated relations of the parts or groups of parts resulted. Accordingly, aside from the resulting expense and increase of weight and possible weakening of the chassis frame, the vehicle was no longer a unitary mechanism of co-ordinated parts and groups of parts as originally designed, assembled and functionally related. In my form of construction, the chassis frame is of standard construction with its central portion so related to the ground that the requirement for a drop section is eliminated, thereby providing for ready and easy entrance to and from the vehicle body, and the relations of parts and groups of parts, as well as the driving and control devices and the connections therefor are unaffected but instead are maintained in their original assembled arrangement.

One object of the invention is to provide an improved vehicle having large capacity for holding or storing the articles to be displayed and sold, a low platform to permit ready ingress and egress and ample space within the vehicle for the driver and the purchaser and movement of the article holders for display and inspection of the articles or commodities.

Another object of the invention is to construct an improved vehicle in which is provided a plurality of storage compartments, driving and control equipment, an intermediate platform and a collapsible seat so arranged that such compartments are completely accessible and the seat may be occupied with facility to permit of rapid ingress and egress and starting and stopping of the vehicle.

Other objects will be apparent to those skilled in the art to which my invention relates from the following description taken in connection with the accompanying drawings, wherein Fig. 1 is a side elevation of a vehicle embodying my invention.

Fig. 2 is a plan view.

Fig. 3 is a rear elevation, one door being shown in open position.

Figs. 4 and 5 are sections on the lines 4—4 and 5—5, respectively, of Fig. 1.

Fig. 6 is a view similar to Fig. 1, but showing certain of the holders moved to open position.

Fig. 7 is a fragmentary view showing the combined locking and stopping means for the inner ends of the holders.

Fig. 8 is a fragmentary side view showing a modified form.

In the drawings, 1 indicates a frame of any desirable construction mounted on front steerable wheels 2 and rear wheels 3, the latter being driven in any desired manner, preferably by power means (for example, an internal combustion engine) enclosed by a hood 4. The frame 1 comprises two spaced longitudinal members 1a connected in any desired manner. The central portions of the frame members 1a are disposed in a horizontal plane below their front and rear ends, which extend upwardly to accommodate the wheels axles. 5 indicates a running board at each side of the frame 1, substantially co-extensive with the horizontal portion thereof, and extending outwardly in approximately the plane of the lower edge of the adjacent frame member 1a. Each running board 5 may be connected at its ends with the adjacent wheel fenders.

6 indicates as an entirety a body mounted on the frame 1 and comprising a top 6a and suitable studding and sills connected in a well known manner and supporting sheet sheathing (wood or metal) in a well known manner. The body is shaped to form a front windshield 7 which extends from the top 6a to a front vertical partition 7a, front side walls 8 having upper panels preferably provided with windows 9, rearward side walls 10 and rear walls 11. The rear walls 11 support a pair of hinged doors 12. The rear walls 11 extend inwardly from the side walls 10 equal distances and form between their inner edges from the flooring (to be later referred to) to the top 6a an opening which is closed by the doors 12. In this arrangement, the free edges of the doors 12 project but a small distance beyond the vehicle body when they are open, as will be understood from Fig. 3. One door 12 has a lateral edge adapted to overlap the other door, so that by means of a single, spring operated latch 12a (see Fig. 3) of suitable construction, both doors may be latched in closed position. The latch is released by a handle 12b. The rearward side walls are provided with inset sections 13, the purpose of which will later appear. The front side walls 8 extend outwardly relative to the frame members 1a and substantially along the outer side edges of the running boards 5 to provide spaces between said body side walls and the vertical sides or walls of the frame members 1a. Also, the rearward side walls 10 are substantially in the plane of the outer edges of the running boards 5 to effect alignment with the front side walls 8 and to provide a maximum enclosed area as will later appear. At each side of the body 6 the front and rearward side walls are spaced apart a suitable distance to form a doorway 6b to permit of ingress and egress. 8' indicates an instrument board mounted between the walls 8 and preferably spaced from the partition 7a. 8x is a horizontal wall extending between the board 8' and partition 7a and adapted to form a shelf.

14 indicates a horizontal flooring preferably co-extensive with the rearward side walls and supported at its rear end on the uppermost portion of the frame members 1a adjacent their rear ends. The front end of the flooring may be supported by the frame studding or in any desired manner on the frame members 1a. 15 indicates a platform mounted on the frame members 1a (see Figs. 1, 4 and 6) and extending from the partition 7a to a point alined with the inner end of the flooring 14. As shown in Fig. 4, the flanges of the frame members 1a are in opposed relation so that their side walls 1b constitute the risers between the running boards 5 and the platform 15. The platform 15 terminates along its opposite sides flush or co-incidently with the side walls 1b. By preference, the platform 15 consists of a relatively thin sheet metal plate which reduces the height of the platform from the running board 5, so that by using a frame 1 which has a low intermediate portion but two easy steps are required to effect ingress. The top 6a is of a height to provide standing room for the driver when standing on the platform 15. 16 indicates a riser which closes the space between the adjacent ends of the flooring and platform.

17 indicates a series of holders for the articles to be stored, displayed and removed or vended. I preferably provide two series of holders in side by side relation, mounted in a supporting frame which comprises the following: 18 indicates a horizontal member spaced above the flooring 14. 19 indicates an upper horizontal member spaced from the top 6a and forming storing spaces 20. The members 18 and 19 extend to and are suitably connected to the studding and sills for the body 6. 21, 21, 21a, indicate outer vertical members and an intermediate vertical member, respectively, which cooperate with the flooring 14 and horizontal member 18 to slidably receive the lowermost holders 17a of the series of holders 17.

22, 22, 22a, indicate outer and intermediate vertical members, respectively, alined with the members 21, 21, 21a, and provided with guides to slidably support the remaining holders 17b of the series of holders 17. The outer vertical members 21—22, 21—22 are disposed in planes disposed inwardly of the inner edges of the rear walls 11 and the guides for the holders 17a, 17b, are open or unobstructed at their opposite ends so that the holders may be moved endwise relative to their supporting frame from their normal position in either direction (see Figs. 1 and 5) and bodily removed therefrom. Accordingly, the vehicle may be backed to a loading platform and the holders moved rearwardly to an extended open position or entirely removed for loading. It will be noted that the holders have a length equal to the length of their supporting frame and that the latter extends from a point adjacent the rear walls 11 forwardly for a distance slightly less than one-half the length of the body. Accordingly, this mounting and arrangement of the holders (1) leaves the remaining forward portion of the body open and unobstructed, thereby providing maximum room for the driver, and (2) permits the respective holders (except the lowermost one behind a driver's seat 23) to be moved forwardly substantially their full length. As a result all of the commodities or articles in the holders may be visualized, examined and readily removed, as in making a sale to a customer.

The space 20 above the horizontal wall 19 may be utilized as a storing chamber for commodities or articles, for example, bread loaves and the like which are too large for the holders. The chamber 20 may be closed at its front end by two transversely slidable doors 24, 24, the top 6a and wall 19 having transverse guides in side by side relation to permit either door to be moved toward the opposite side of the body to permit access to the chamber 20. By extending the flooring 14 forwardly of the holder supporting frame, a step 25 is provided to facilitate the removal of commodities stored in the chamber 20. The members 22, horizontal walls 19, 19 and rear side walls 10 form additional storing chambers 26, 26, for other commodities. These chambers are provided with rear walls 26a and hinged doors 27.

The rearward side walls 19 extend forwardly beyond the series of holders 17. This arrangement serves to protect the holders from the elements even when they are opened a short distance; it also disposes the door ways 6b substantially centrally of the space between the holders 17 and front partition 7a so that movement into and out of the body and around the seat and operation of the holders are facilitated.

The seat 23 is preferably of the collapsible or foldable type so as to permit ready access to the series of holders behind the seat; and when the latter is collapsed (see Fig. 6) all of the holders of this series may be moved to their full open position except the lower holder 17a. The seat 23 and the driving and control devices (steering wheel 28, clutch pedal 29 and service brake pedal 30) are arranged in line with the series of holders 17 on the left hand side of the body for the following reasons: (1) with the seat 23 in upright or normal position, the holders of the other series may be moved to their full open position and (2) the seat being close to the adjacent frame member 1a, it enables the driver to step onto the adjacent running board in the space between the front side wall 8 and frame member 1a and slide onto the seat 23 without taking an additional step onto the platform 15.

The seat 23 comprises the following: 31 indicates a seat member having front legs 32 pivotally mounted on the platform 15 and rear brackets 33 to which is pivoted a seat back 34. 35 indicates rear legs for the seat member pivoted to a pair of depending lugs 36. 37 indicates a connector having diverging sections connected at their rear ends to the rear legs 35 and at their front ends pivotally connected to the platform 15 on an axis coincident with the axis about which the front legs swing. In this form of construction, the seat back 34 is foldable onto the seat member 31 and both may be swung forwardly and downwardly to the position shown in Fig. 6, to permit access to the adjacent series of holders and free movement of the driver on the platform 15.

Each doorway 6b is provided with a door comprising hinged together front and rear sections 38, 39, the latter being hinged to the front vertical edge of the adjacent rearward wall 10. The front end of the front section 38 is provided with projections which slide in slots formed in the top 6a and adjacent running board, the slot in the latter being shown at 40. When the door is opened, its sections swing relatively to each other and the wall 10 into the adjacent inset 13 as shown in Figs. 5 and 6.

The doors and their mountings in combination with a vehicle body are similar in construction to that disclosed in and forming the subject-matter of my co-pending application Ser. No. 705,908 (see Letters Patent No. 2,011,596, dated August 20, 1935), for which reason further detail disclosure of the door and its mounting is not made herein and no claim thereto is made in this application. In this arrangement of door mounting the interior construction of the body is simplified, slideways which are apt to get out of alignment are eliminated, a large portion of the rearward side walls are exposed for decorative and advertising purposes and relatively little lateral area or space is required to permit opening and closing of the doors.

At their front and rear ends, the vertical walls 21a, 22a, are provided with removable stopping means preferably of similar construction and each comprising the following: 41 indicates spaced studs mounted in these walls and provided on their outer ends with heads. The studs may consist of screws. 42 indicates a plate, detachably mounted on the adjacent studs and having a length to overlap the lower holders 17a and the uppermost holder 17b and a width to overlap all of the holders of both series 17. To permit of the detachment of the plate from and its attachment to the studs, the plate is formed with spaced openings 43, elongated vertically, the lower ends of the openings being enlarged to permit the stud heads to pass therethrough, following which the plate 42 is allowed to slide downwardly and thus permit the heads to engage the outer face of the plate. When the holders are being loaded, the plate 42 at the front end of the walls 21a, 22a, may be positioned to limit the inward movement of the holders and when deliveries or sales are being made the plate 42 at the rear end of the walls 21a, 22a, may be positioned to limit the rearward movement of the holders. In these arrangements, loading and operation of the holders in making sales are greatly facilitated. When the vehicle is being driven for a considerable distance, both plates 42 may be positioned to prevent endwise movement of the holders due to starting and stopping of the vehicle.

Each holder is preferably provided with a handle 43' at each end.

Fig. 8 illustrates a modified form of construction in which the top 6a extends to the inner vertical sill for the front side walls 8 and the body 6 is provided with a front wall 44 which is connected to a separate top 6' extending between the panels 9 and windshield 7.

In my construction of vehicle the vehicle frame is provided with a relatively low, horizontal portion intermediate the wheels 2, 3, which eliminates the provision of a transverse well or drop section, projecting parts to accommodate the propeller shaft, increased weight, danger of weakening the chassis frame and extra expense for alteration. My form of construction provides a large unobstructed platform substantially equal to one-half the interior area of the body sufficient to accommodate the driver and his customer, for example, when desirable, on account of weather conditions; it also permits each or two or more of the holders (except one lowermost holder) to be opened substantially their full length.

As alterations are not made in the chassis frame, no changes are required in the driving and control elements and the connections therefor.

To those skilled in the art to which my invention relates many changes in construction and widely differing embodiments and applications of the invention will suggest themselves without departing from the spirit and scope thereof. My disclosures and the description herein are purely illustrative and not intended to be in any sense limiting.

What I claim is:

In a wheel mounted vehicle having a chassis comprising substantially horizontal continuous side frames each having a running board along a portion and outwardly thereof and a power plant mounted on said frames at the forward end thereof, a closed body on said frames rearward of said power plant, the opposite sides of said body being formed with alined doorways related to said running boards, a platform mounted on said frames and covering the entire area within said body from the rear sides of said doorways forwardly thereof and between the outer side edges of said side frames, the roof of said body being spaced from said platform to permit an operator to stand thereon in normal erect position, a separate platform on said frames extending rearwardly from the rear sides of said doorways and disposed in a plane above said first mentioned platform, storing devices on said last mentioned platform rearwardly of its forward end, whereby the forward end portion of said separate platform forms a step, and a seat on said first mentioned platform adjacent one side edge thereof and mounted to move forwardly thereon to a position substantially forwardly of the adjacent doorway.

EDWARD J. STAHL.